Nov. 26, 1929.  H. R. C. ANTHONY  1,737,445
DRY BATTERY CONSTRUCTION
Filed May 18, 1928
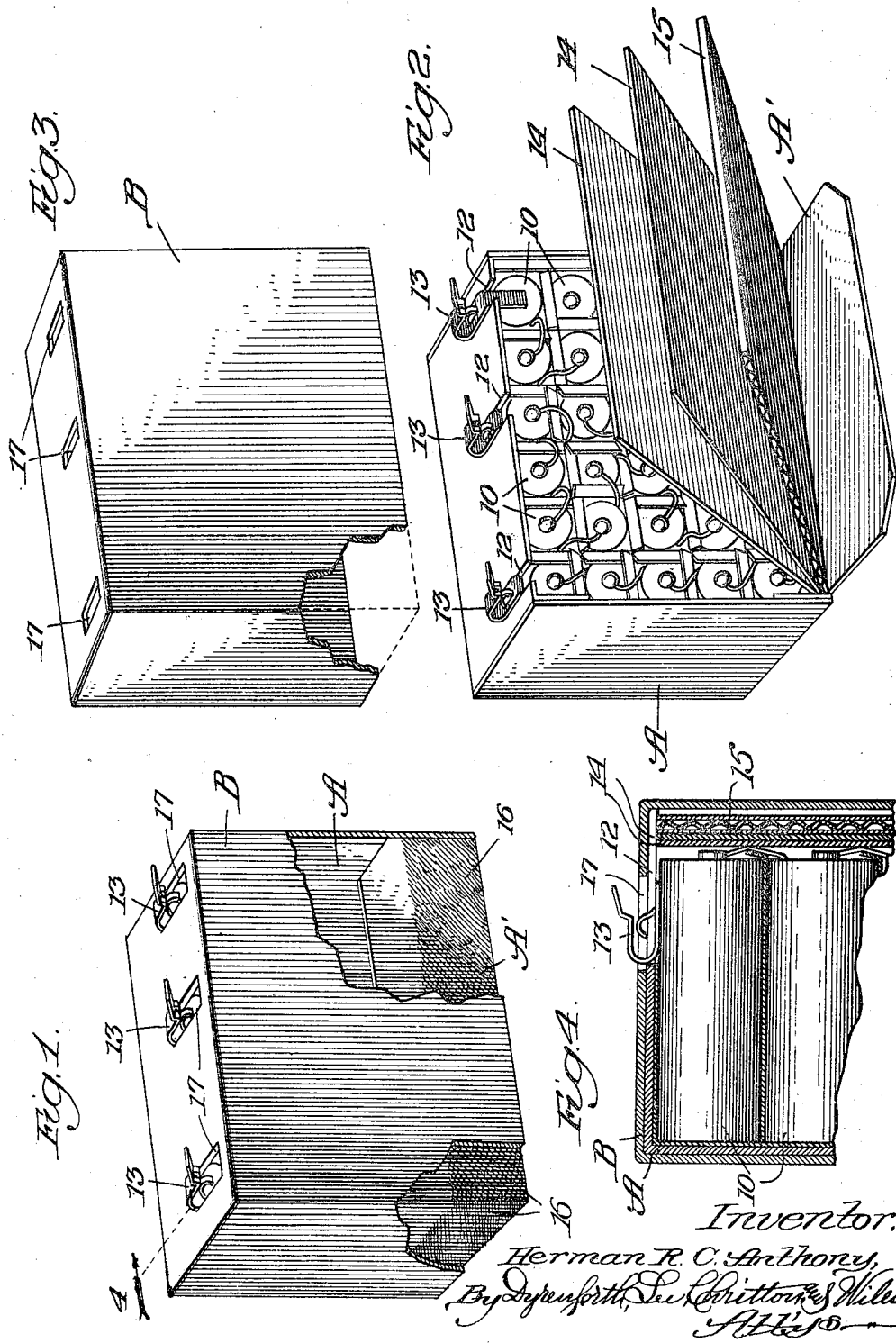
Inventor:
Herman R. C. Anthony,
By Dyrenforth, Lee, Chritton & Wiles,
Att'ys Patented Nov. 26, 1929

1,737,445

UNITED STATES PATENT OFFICE

HERMAN R. C. ANTHONY, OF MADISON, WISCONSIN, ASSIGNOR TO FRENCH BATTERY COMPANY, OF MADISON, WISCONSIN, A CORPORATION OF WISCONSIN

DRY-BATTERY CONSTRUCTION

Application filed May 18, 1928. Serial No. 278,723.

This invention relates to improvements in dry battery construction; and more especially to dry batteries having a plurality of cells, usually more than six, such as, for example, are used for "B" batteries in radio work. Such batteries usually have at least twelve cells; and frequently as many as 24 or 30. The construction of such a battery with a relatively large number of cells involves many difficulties and problems. The individual cells must be securely housed or packed, connected, and the whole battery properly sealed and protected.

By the use of my invention, it is possible to construct such a battery with a relatively large number of cells quickly and cheaply, and produce an efficient, durable and neat battery. Moreover, my improved battery dispenses with the use of pitch, wax, or similar sealing compounds in the upper portion of the main container and between cells, thus affording a lighter weight battery and further reducing the cost.

In that form of device embodying the feature of my invention shown in the accompanying drawings—

Figure 1 is a view in perspective showing portions broken away; Fig. 2 is a similar view showing the outer box removed; Fig. 3 is a similar view of the outer box; and Fig. 4 is a view taken as indicated by the line 4 of Fig. 1.

As shown in the drawings, A indicates an inner rectangular cardboard box open at one side, in which the individual cells 10, 10, are assembled in horizontal position. The lower edge of the box A on the open side is provided with a flap A' adapted to be folded upwardly over this open side to cover substantially the lower half of the same; but it may be made larger or smaller.

The cells may be separated and held in position in the box A in any suitable manner. As here shown, I provide interlocking cardboard partitions 11, 11, of the egg-crate type with their outer edges, as indicated by 11ª, projecting to provide tabs which are bent over the upper edges of the zinc shells to prevent the connecting wires from contacting therewith.

The upper surface of the box A is provided with slots 12 to accommodate the clip terminals 13 as the cells are put in place. The usual wiring connections may be made.

The open side of the box A is covered with one or more (here shown as two) sheets 14 of waterproofed material, which, for example, may be paraffined paper. Over the sheets 14 is preferably placed another sheet 15 of cellular cardboard to protect the ends of the cells against damage. The sheets 14 and 15 are placed under the flap A', a waterproofed sheet 14 preferably lying adjacent the tops of the cells.

In constructing the battery, after the cells and protecting sheets 14 and 15 are put in place, the flap A' is folded upwardly against the outer sheet 15 and a coating of glue 16 applied to its outer surface, such coating of glue extending around on the lower margins of the other three sides of the box A.

An outer open bottom rectangular cardboard box B is then slipped over the inner box and its lower marginal edges pressed inwardly against the coating of glue 16 until it sets. The upper surface of the outer box B is provided with openings 17 through which the clip terminals 13 project. It is obvious that terminals of any other type, for example screw terminals, may be substituted for the clip terminals 13. In using the clip terminals the outer connecting wires (not shown) inserted in such terminals may contribute to hold the outer box B on the lower inner box A.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. A battery comprising; an inner box with an open side, said box having openings in its top; a plurality of electrically connected horizontally disposed cells nested in said box, some of said cells being equipped with terminals extending through the openings in the top of said box; a flap rising from the lower edge of the open side of said box; an outer open bottom box telescoped over the inner box and flap, said outer box having openings in its top to accommodate the aforementioned cell terminals; and means for holding the boxes together, said means including a suitable adhesive applied to contacting surfaces of the outer and inner boxes including the flap.

2. A battery comprising; an inner box with an open side, said box having openings in its top; a plurality of electrically connected horizontally disposed cells nested in said box, some of said cells being equipped with terminals extending through the openings in the top of said box; a flap rising from the lower edge of the open side of said box; a sheet of waterproofed material closing the open side of said box and lying over the ends of the cells therein and under said flap; an outer open bottom box telescoped over the inner box and flap, said outer box having openings in its top to accommodate the aforementioned cell terminals; and means for holding the boxes together, said means including a suitable adhesive applied to contacting surfaces of the outer and inner boxes including the flap.

In witness whereof, I have hereunto set my hand this 3d day of May, 1928.

HERMAN R. C. ANTHONY.